(12) United States Patent
Nakanishi et al.

(10) Patent No.: US 10,782,574 B2
(45) Date of Patent: Sep. 22, 2020

(54) IMAGE DISPLAY DEVICE

(71) Applicant: PANASONIC INTELLECTUAL PROPERTY MANAGEMENT CO., LTD., Osaka (JP)

(72) Inventors: Hirokazu Nakanishi, Osaka (JP); Takashi Higashida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/348,093

(22) PCT Filed: Jul. 10, 2018

(86) PCT No.: PCT/JP2018/025958
§ 371 (c)(1),
(2) Date: May 7, 2019

(87) PCT Pub. No.: WO2019/116618
PCT Pub. Date: Jun. 20, 2019

(65) Prior Publication Data
US 2020/0264469 A1    Aug. 20, 2020

(30) Foreign Application Priority Data
Dec. 14, 2017    (JP) .................................. 2017-239707

(51) Int. Cl.
*G02F 1/1347*    (2006.01)
*G02F 1/1339*    (2006.01)
(Continued)

(52) U.S. Cl.
CPC ........ *G02F 1/13471* (2013.01); *G02F 1/1339* (2013.01); *G02F 1/133528* (2013.01); *G02F 1/133605* (2013.01)

(58) Field of Classification Search
CPC .................................................. G02F 1/13471
See application file for complete search history.

(56) References Cited

U.S. PATENT DOCUMENTS

| | | | |
|---|---|---|---|
| 2008/0088649 A1* | 4/2008 | Ikeno ................... | G09G 3/3611 345/690 |
| 2009/0109351 A1 | 4/2009 | Shiomi | |
| 2010/0091204 A1* | 4/2010 | Chen ..................... | G02B 30/27 349/15 |

FOREIGN PATENT DOCUMENTS

WO    2007/108183 A1    9/2007

OTHER PUBLICATIONS

International Search Report and Written Opinion dated Oct. 16, 2018 in International Application No. PCT/JP2018/025958.

* cited by examiner

*Primary Examiner* — Edmond C Lau
(74) *Attorney, Agent, or Firm* — McDermott Will & Emery LLP (57) ABSTRACT

An image display device includes a first liquid crystal panel, a second liquid crystal panel which faces a rear surface of the first liquid crystal panel, and a backlight which irradiates a rear surface of the second liquid crystal panel with light. The first liquid crystal panel includes a first front polarizer on a front surface of the first liquid crystal panel, a first rear polarizer on the rear surface of the first liquid crystal panel, and a first liquid crystal cell between the first front and rear polarizers. The second liquid crystal panel includes a second front polarizer on a front surface of the second liquid crystal panel, a second rear polarizer disposed on the rear surface of the second liquid crystal pane, and smaller than the first rear polarizer in top view, and a second liquid crystal cell between the second front and rear polarizers.

6 Claims, 7 Drawing Sheets

(51) Int. Cl.
*G02F 1/1335* (2006.01)
*G02F 1/13357* (2006.01)

IMAGE DISPLAY DEVICE

CROSS-REFERENCE OF RELATED APPLICATIONS

This application is the U.S. National Phase under 35 U.S.C. § 371 of International Patent Application No. PCT/JP2018/025958, filed on Jul. 10, 2018, which in turn claims the benefit of Japanese Application No. 2017-239707, filed on Dec. 14, 2017, the entire disclosures of which Applications are incorporated by reference herein.

TECHNICAL FIELD

The present disclosure relates to an image display device displaying images.

BACKGROUND ART

Patent Literature (PTL) 1 discloses an image display device including two liquid crystal panels (i.e., liquid crystal displays (LCDs)) stacked one on top of the other. This type of image display device reduces light leaking from a backlight to display images with a lower black level at a high contrast ratio, as compared to a case using only one liquid crystal panel.

CITATION LIST

Patent Literature

PTL 1: International Publication No. WO2007/108183

SUMMARY OF THE INVENTION

Technical Problem

The present disclosure provides an image display device capable of increasing a viewing angle.

Solutions to Problem

The image display device according to the present disclosure includes a first liquid crystal panel which displays an image on a front surface of the first liquid crystal panel, a second liquid crystal panel including a front surface facing a rear surface of the first liquid crystal panel, and a backlight which irradiates a rear surface of the second liquid crystal panel with light. The first liquid crystal panel includes a first front polarizer which has a first transmission axis, and is disposed on the front surface of the first liquid crystal panel; a first rear polarizer which has a second transmission axis extending in a direction different from the first transmission axis, and is disposed on the rear surface of the first liquid crystal panel; and a first liquid crystal cell disposed between the first front polarizer and the first rear polarizer. The second liquid crystal panel includes a second front polarizer which has a third transmission axis extending in a same direction as the second transmission axis, and is disposed on the front surface of the second liquid crystal panel; a second rear polarizer which is smaller than the first rear polarizer in top view, has a fourth transmission axis extending in a direction different from the third transmission axis, and is disposed on the rear surface of the second liquid crystal panel; and a second liquid crystal cell disposed between the second front polarizer and the second rear polarizer.

Advantageous Effect of Invention

The image display device according to the present disclosure increases a viewing angle.

DESCRIPTION OF EXEMPLARY EMBODIMENTS

Exemplary embodiments will now be described below in detail with reference to the drawings as appropriate. However, an unnecessarily detailed description may be omitted. For example, a detailed description of a matter already known well and a redundant description of substantially the same configuration may be omitted. This is intended to avoid making the following description unnecessarily redundant and to facilitate understanding of a person skilled in the art.

Note that the inventors provide the accompanying drawings and the following description in order that a person skilled in the art sufficiently understands the present disclosure, and thus do not intend to limit the subject matter of the claims by the drawings and the description.

Embodiment 1

1.1. Configuration of Image Display Device

Figure 1:
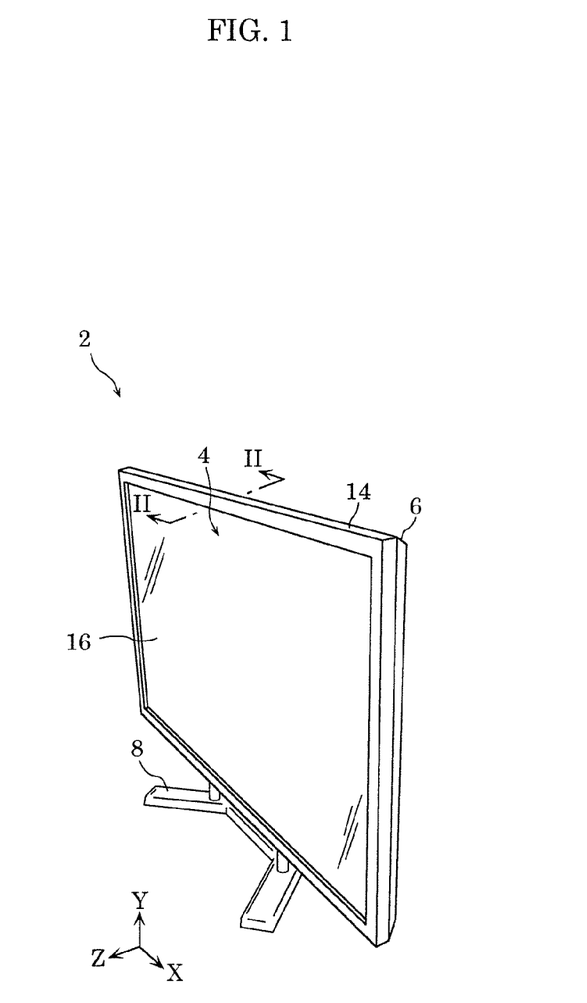
FIG. 1 is a perspective view illustrating a front appearance of an image display device according to Embodiment 1.
Figure 2:
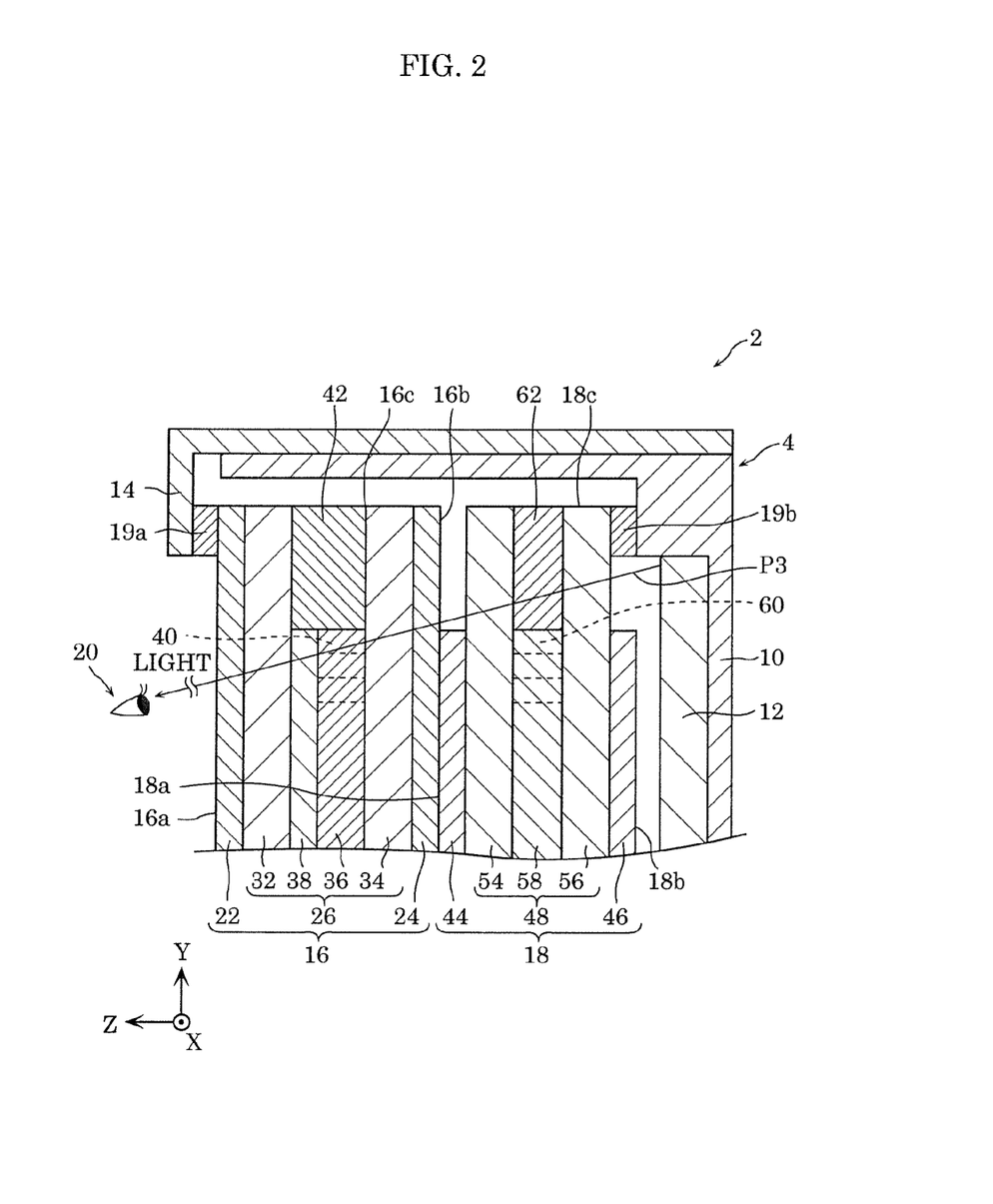
FIG. 2 is a cross-sectional view taken along the line II-II of FIG. 1, illustrating a main part of the image display device according to Embodiment 1.
Figure 3:
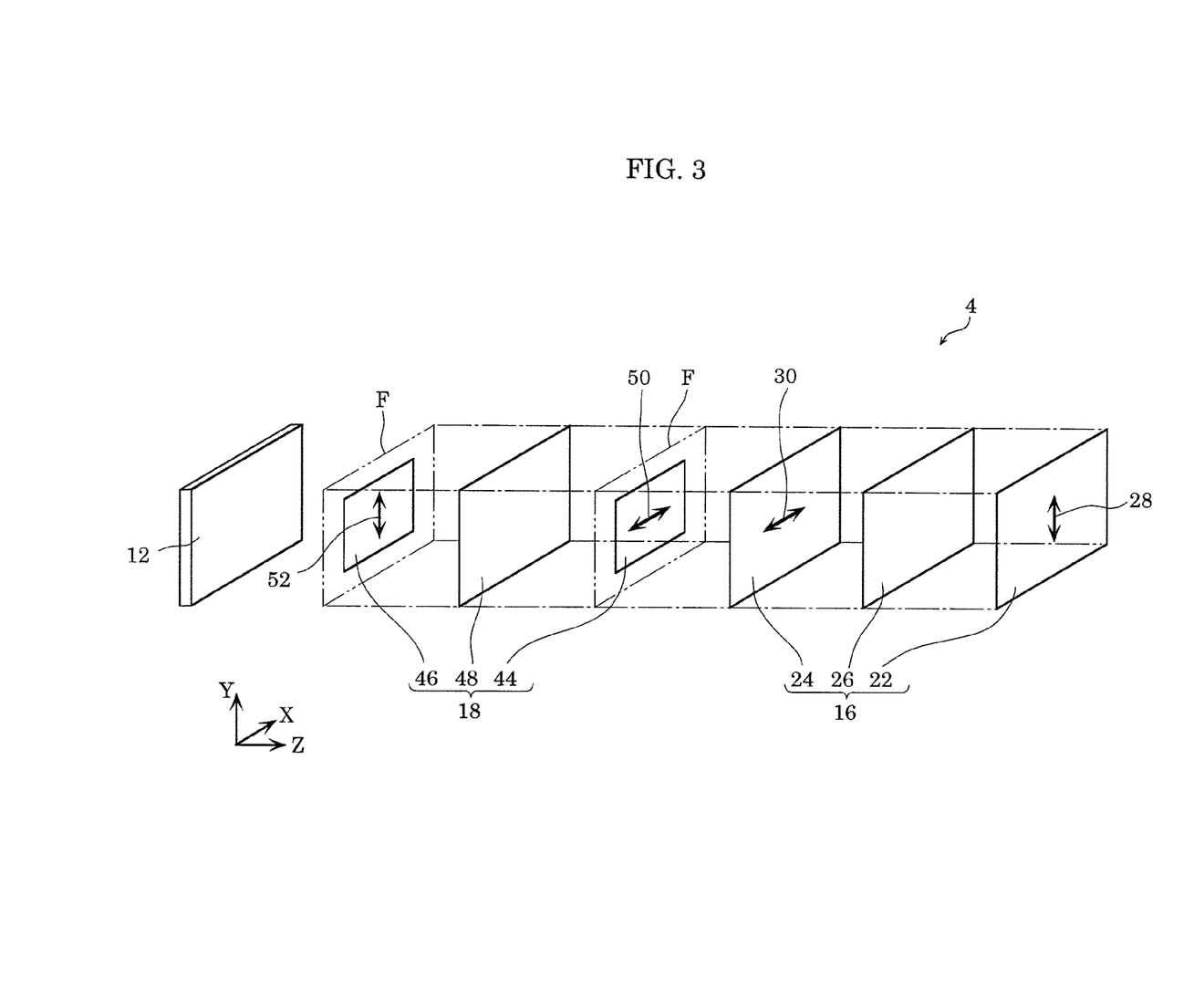
FIG. 3 is a partially exploded perspective view of a liquid crystal module according to Embodiment 1.

First, a configuration of image display device 2 according to Embodiment 1 will be described with reference to FIGS. 1 to 3. FIG. 1 is a perspective view illustrating a front appearance of image display device 2 according to Embodiment 1. FIG. 2 is a cross-sectional view taken along the line II-II of FIG. 1, illustrating a main part of image display device 2 according to Embodiment 1. FIG. 3 is a partially exploded perspective view of liquid crystal module 4 according to Embodiment 1.

As shown in FIG. 1, image display device 2 is, for example, a flat panel liquid crystal display television receiver. Image display device 2 includes liquid crystal module 4, back cover 6 covering a rear surface of liquid crystal module 4, and stand 8 supporting liquid crystal module 4.

Liquid crystal module 4 is a unit for displaying images (incl. still and moving images). As shown in FIGS. 2 and 3, liquid crystal module 4 includes lower frame 10, backlight 12, upper frame 14, first liquid crystal panel 16, and second liquid crystal panel 18. For convenience of explanation, back cover 6 is not shown in FIG. 2, and lower frame 10 and upper frame 14 are not shown in FIG. 3.

Lower frame 10 is a member for supporting, for example, backlight 12. Lower frame 10 is made of, for example, a resin such as polycarbonate.

Backlight 12 is, for example, a direct backlight supported by lower frame 10. Although not shown in the figures, backlight 12 includes a plurality of light emitting diodes (LEDs), a reflection sheet, a diffuser, and an optical sheet. The reflection sheet reflects the light coming from the LEDs. The diffuser diffuses the light coming from the LEDs. The optical sheet is for, for example, collecting the light coming from the diffuser. Backlight 12 irradiates rear surface 18b (i.e., the surface closer to backlight 12) of second liquid crystal panel 18 with light. The light coming from backlight 12 includes light having all polarization directions.

Upper frame 14 is a member for protecting periphery 16c of first liquid crystal panel 16, and periphery 18c of second liquid crystal panel 18. Upper frame 14 is formed in a rectangular frame in XY top view, and disposed to cover periphery 16c of first liquid crystal panel 16 and periphery 18c of second liquid crystal panel 18. Upper frame 14 is made of, for example, a resin such as polycarbonate. As shown in FIG. 2, upper frame 14 and lower frame 10 sandwich first liquid crystal panel 16 and second liquid crystal panel 18. Cushion member 19a is sandwiched between upper frame 14 and front surface 16a (i.e., the surface farther from backlight 12) of first liquid crystal panel 16. Cushion member 19b is sandwiched between lower frame 10 and rear surface 18b of second liquid crystal panel 18.

First liquid crystal panel 16 is, for example, a twisted nematic liquid crystal panel, in which the alignment direction of liquid crystal molecules is twisted at 90°, and formed in a rectangular shape in XY top view. Front surface 16a of first liquid crystal panel 16 displays first images.

As shown in FIGS. 2 and 3, first liquid crystal panel 16 includes first front polarizer 22, first rear polarizer 24, and first liquid crystal cell 26. These first front polarizer 22, first liquid crystal cell 26, and first rear polarizer 24 are stacked one on top of another in this order from front to back (i.e., from positive to negative sides of the Z-axis) as seen from user 20 who views image display device 2. First front polarizer 22, first liquid crystal cell 26, and first rear polarizer 24 have the same size in XY top view.

As shown in FIGS. 2 and 3, first front polarizer 22 is formed in a rectangular shape in XY top view, and disposed on front surface 16a of first liquid crystal panel 16. First front polarizer 22 has a thickness of, for example, 0.3 mm. As shown in FIG. 3, first front polarizer 22 has first transmission axis 28 indicating the polarization direction of the light passing through first front polarizer 22. That is, first front polarizer 22 transmits, out of the light incident from first liquid crystal cell 26 to first front polarizer 22, only the light having polarization directions parallel to first transmission axis 28. First transmission axis 28 extends, for example, along the Y-axis.

As shown in FIGS. 2 and 3, first rear polarizer 24 is formed in a rectangular shape in XY top view, and disposed on rear surface 16b (i.e., the surface closer to backlight 12) of first liquid crystal panel 16. First rear polarizer 24 has a thickness of, for example, 0.3 mm. As shown in FIG. 3, first rear polarizer 24 has second transmission axis 30 indicating the polarization direction of the light passing through first rear polarizer 24. That is, first rear polarizer 24 transmits, out of the light incident from second liquid crystal panel 18 to first rear polarizer 24, only the light having polarization directions parallel to second transmission axis 30. Second transmission axis 30 extends perpendicularly to first transmission axis 28 of first front polarizer 22 (an example of a direction different from first transmission axis 28), and extends, for example, along the X-axis.

As shown in FIGS. 2 and 3, first liquid crystal cell 26 is disposed between first front polarizer 22 and first rear polarizer 24. First liquid crystal cell 26 includes first front glass substrate 32, first rear glass substrate 34, first liquid crystal layer 36, and color filter 38.

Each of first front glass substrate 32 and first rear glass substrate 34 is made of a translucent material such as transparent glass. First front glass substrate 32 and first rear glass substrate 34 are formed in rectangular shapes with the same size in XY top view, and face each other. First front glass substrate 32 faces first front polarizer 22, while first rear glass substrate 34 faces first rear polarizer 24. First front glass substrate 32 has the same size as first front polarizer 22 in XY top view, while first rear glass substrate 34 has the same size as first rear polarizer 24 in XY top view.

First liquid crystal layer 36 is a liquid crystal layer made of, for example, twisted nematic liquid crystal molecules, and disposed between first front glass substrate 32 and first rear glass substrate 34. First liquid crystal layer 36 is formed in a rectangular shape in XY top view, and includes a plurality of first pixels 40 arranged in a matrix. In FIG. 2, only the ones of first pixels 40 disposed at an upper end of first liquid crystal layer 36 are shown for convenience of explanation. The entire periphery of first liquid crystal layer 36 is sealed with first sealing material 42. That is, first liquid crystal layer 36 is smaller than each of first front glass substrate 32 and first rear glass substrate 34 in XY top view. First front glass substrate 32 and first rear glass substrate 34 are bonded together via first sealing material 42.

Color filter 38 is a filter for transmitting light within a specific wavelength range, and disposed between first front glass substrate 32 and first liquid crystal layer 36. Color filter 38 includes a plurality of RGB filters (not shown) corresponding to the plurality of first pixels 40 of first liquid crystal layer 36. Each of the RGB filters includes any one of red (R), green (G), and blue (B) filters.

Although not shown in the figure, for example, the following elements are disposed between first front glass substrate 32 and first rear glass substrate 34, other than first liquid crystal layer 36 and color filter 38 described above:

a) an alignment film aligning the liquid crystal molecules of first liquid crystal layer 36;

b) electrodes including thin film transistors (TFTs), and applying voltages for driving the liquid crystal molecules;

c) insulating films covering the electrodes; and d) a black matrix blocking light among the red, green, and blue filters of color filter 38.

Second liquid crystal panel 18 is, for example, a twisted nematic liquid crystal panel formed in a rectangular shape in XY top view. Front surface 18a (i.e., the surface farther from backlight 12) of second liquid crystal panel 18 displays second images. First liquid crystal panel 16 and second liquid crystal panel 18 are stacked one on top of the other, and adhered to each other with, for example, an adhesive. Front surface 18a of second liquid crystal panel 18 faces rear surface 16b of first liquid crystal panel 16.

As shown in FIGS. 2 and 3, second liquid crystal panel 18 includes second front polarizer 44, second rear polarizer 46, and second liquid crystal cell 48. These second front polarizer 44, second liquid crystal cell 48, and second rear polarizer 46 are stacked one on top of another in this order from front to back as seen from user 20 who views image display device 2.

Second front polarizer 44 and second rear polarizer 46 have the same size in XY top view, and is smaller than second liquid crystal cell 48 in XY top view. Second front polarizer 44 and second rear polarizer 46 have the same size as second liquid crystal layer 58 of second liquid crystal cell 48 in XY top view, and are smaller than first rear polarizer 24 in XY top view. That is, the peripheries of second front polarizer 44 and second rear polarizer 46 overlap the periphery of second liquid crystal layer 58 of second liquid crystal cell 48 in XY top view. To facilitate size comparison, frame lines F of two-dot chain lines representing the size of first rear polarizer 24 are drawn in FIG. 3 on the same plane as second front polarizer 44 and second rear polarizer 46.

As shown in FIGS. 2 and 3, second front polarizer 44 is formed in a rectangular shape in XY top view, and disposed on front surface 18a of second liquid crystal panel 18. Second front polarizer 44 has a thickness of, for example, 0.3 mm. As shown in FIG. 3, second front polarizer 44 has third transmission axis 50 indicating the polarization direction of the light passing through second front polarizer 44. That is, second front polarizer 44 transmits, out of the light incident from second liquid crystal cell 48 to second front polarizer 44, only the light having polarization directions parallel to third transmission axis 50. Third transmission axis 50 extends in the same direction as second transmission axis 30 of first rear polarizer 24, for example, along the X-axis.

As shown in FIGS. 2 and 3, second rear polarizer 46 is formed in a rectangular shape in XY top view, and disposed on rear surface 18b of second liquid crystal panel 18. Second rear polarizer 46 has a thickness of, for example, 0.3 mm. As shown in FIG. 3, second rear polarizer 46 has fourth transmission axis 52 indicating the polarization direction of the light passing through second rear polarizer 46. That is, second rear polarizer 46 transmits, out of the light incident from backlight 12 to second rear polarizer 46, only the light having polarization directions parallel to fourth transmission axis 52. Fourth transmission axis 52 extends perpendicularly to third transmission axis 50 of second front polarizer 44 (an example of a direction different from third transmission axis 50), and extends in the same direction as, for example, the Y-axis.

As shown in FIGS. 2 and 3, second liquid crystal cell 48 is disposed between second front polarizer 44 and second rear polarizer 46. Second liquid crystal cell 48 includes second front glass substrate 54 (an example of a front transparent substrate), second rear glass substrate 56 (an example of a rear transparent substrate), and second liquid crystal layer 58 (an example of a liquid crystal layer).

Each of second front glass substrate 54 and second rear glass substrate 56 is made of a translucent material such as transparent glass. Second front glass substrate 54 and second rear glass substrate 56 are formed in rectangular shapes with the same size in XY top view, and face each other. Second front glass substrate 54 faces second front polarizer 44, while second rear glass substrate 56 faces second rear polarizer 46. Second front glass substrate 54 is larger than second front polarizer 44 in XY top view, while second rear glass substrate 56 is larger than second rear polarizer 46 in XY top view.

Second liquid crystal layer 58 is a liquid crystal layer made of, for example, twisted nematic liquid crystal molecules, and disposed between second front glass substrate 54 and second rear glass substrate 56. Second liquid crystal layer 58 is formed in a rectangular shape in XY top view, and includes a plurality of second pixels 60 arranged in a matrix. In FIG. 2, only the ones of second pixels 60 disposed at an upper end of second liquid crystal layer 58 are shown for convenience of explanation. The entire periphery of second liquid crystal layer 58 is sealed with second transparent sealing material 62 (an example of a sealing material). That is, second liquid crystal layer 58 is smaller than each of second front glass substrate 54 and second rear glass substrate 56 in XY top view. Second front glass substrate 54 and second rear glass substrate 56 are bonded together via second sealing material 62.

Although not shown in the figure, for example, the following elements are disposed between second front glass substrate 54 and second rear glass substrate 56, other than second liquid crystal layer 58 described above:

a) an alignment film aligning the liquid crystal molecules of second liquid crystal layer 58, b) electrodes including TFTs, and applying voltages for driving the liquid crystal molecules, and c) insulating films covering the electrodes.

1.2. Advantageous Effects

Figure 4:
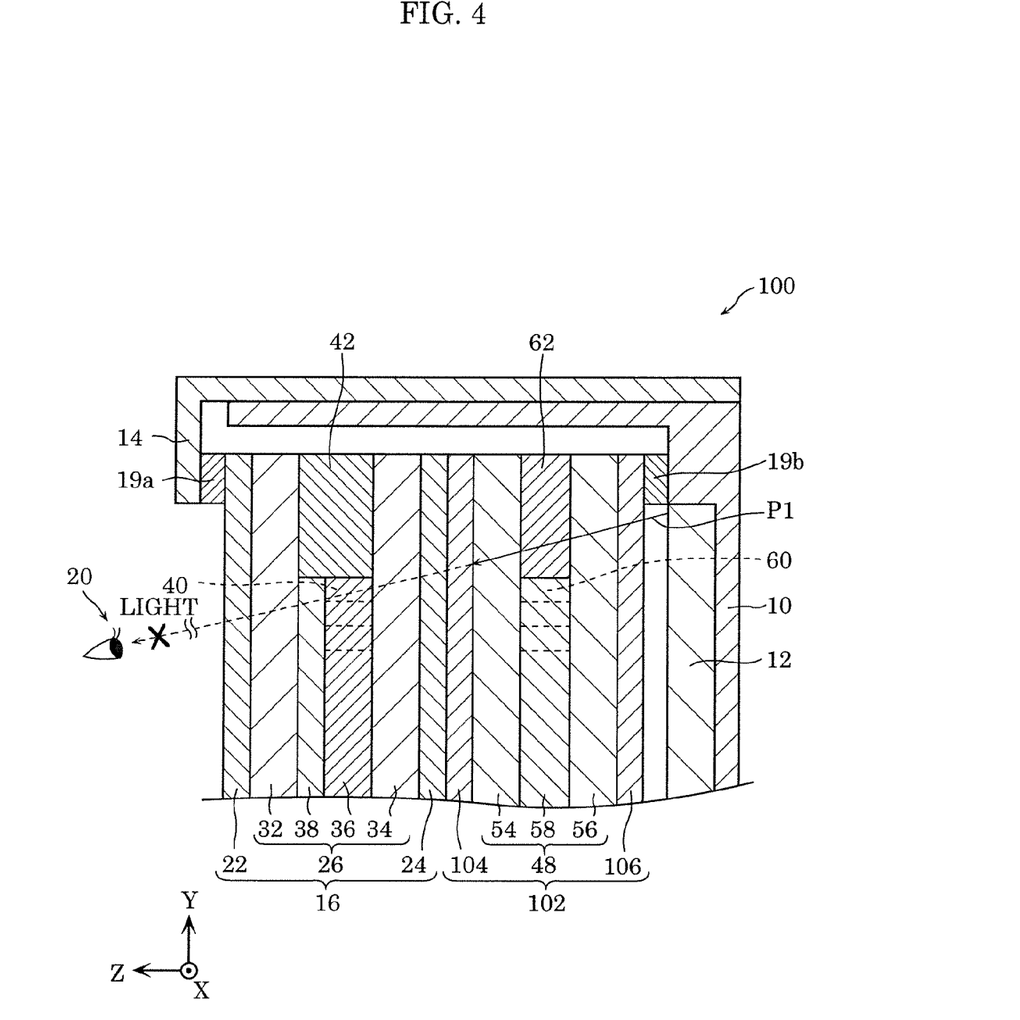
FIG. 4 is a cross-sectional view illustrating a main part of an image display device according to Comparative Example 1.
Figure 5:
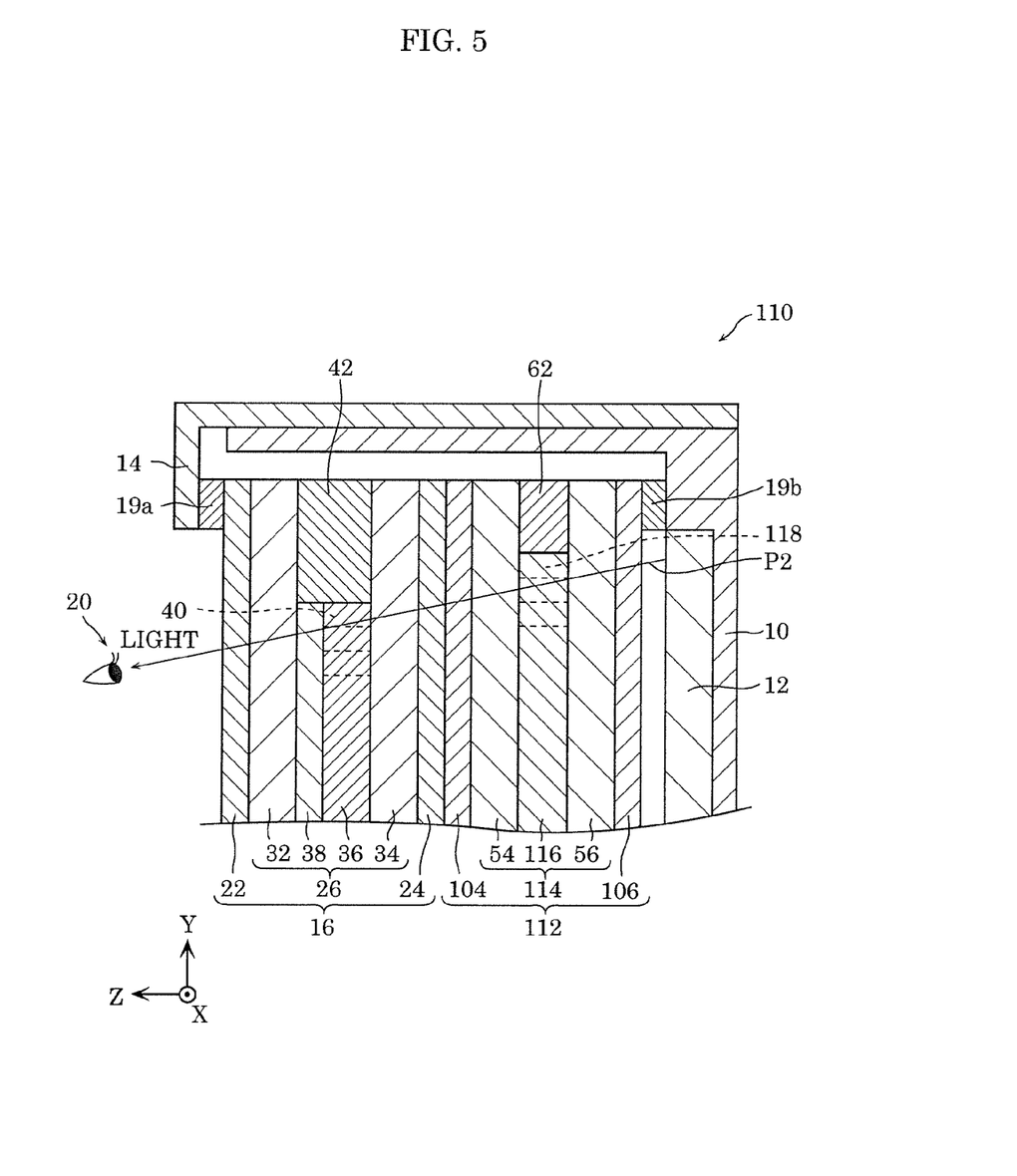
FIG. 5 is a cross-sectional view illustrating a main part of an image display device according to Comparative Example 2.

Next, advantageous effects obtained from image display device 2 according to Embodiment 1 will be described with reference to FIGS. 2, 4, and 5. FIG. 4 is a cross-sectional view illustrating a main part of image display device 100 according to Comparative Example 1. FIG. 5 is a cross-sectional view illustrating a main part of image display device 110 according to Comparative Example 2. In FIGS. 4 and 5, the same reference characters as those of image display device 2 shown in FIG. 2 are used to represent equivalent elements, and the detailed explanation thereof will be omitted.

As shown in FIG. 4, in image display device 100 according to Comparative Example 1, second front polarizer 104 and second rear polarizer 106 of second liquid crystal panel 102 have the same size in XY top view, and have the same size as first rear polarizer 24 in XY top view. That is, each of second front polarizer 104 and second rear polarizer 106 is larger than second liquid crystal layer 58 of second liquid crystal cell 48 in XY top view.

However, such a configuration does not allow user 20 to visually recognize first pixels 40 disposed at the top, bottom, right, and left ends of first liquid crystal layer 36 of first liquid crystal panel 16, when viewing image display device 100 obliquely from the right front direction (i.e., the Z-axis). The reason will be described below.

The light coming from backlight 12 passes through second rear polarizer 106 of second liquid crystal panel 102 to be polarized in a direction parallel to a fourth transmission axis (i.e., along the Y-axis). At this time, as indicated by arrow P1 in FIG. 4, the light having passed through second rear polarizer 106 obliquely from the right front direction does not pass through second liquid crystal layer 58. Thus, the polarization direction of the light having passed through second rear polarizer 106 remains parallel to the fourth transmission axis, without being (optically) rotated at 90° by the liquid crystal molecules of second liquid crystal layer 58. Accordingly, the light having passed through second rear polarizer 106 cannot pass through second front polarizer 104 not to reach first pixels 40 disposed at the top, bottom, right, and left ends of first liquid crystal layer 36. This does not allow user 20 to visually recognize first pixels 40 disposed at the top, bottom, right, and left ends of first liquid crystal layer 36, when viewing image display device 100 obliquely from the right front direction. That is, the problem of a smaller viewing angle arises.

On the other hand, as shown in FIG. 5, in image display device 110 according to Comparative Example 2, second liquid crystal layer 116 of second liquid crystal cell 114 of second liquid crystal panel 112 is larger than first liquid crystal layer 36 of first liquid crystal cell 26 in XY top view. That is, the number of second pixels 118 of second liquid crystal layer 116 is larger than that of first pixels 40 of first liquid crystal layer 36. Second front polarizer 104 and second rear polarizer 106 of second liquid crystal panel 112 have the same or similar sizes to those of Comparative Example 1 described above.

As indicated by arrow P2 in FIG. 5, the light having passed through second rear polarizer 106 obliquely from the right front direction passes through second liquid crystal layer 116. Thus, the polarization direction of the light having passed through second rear polarizer 106 is rotated at 90° from fourth transmission axis by the liquid crystal molecules of second liquid crystal layer 116 to be parallel to third transmission axis. Accordingly, the light having passed through second rear polarizer 106 can pass through second front polarizer 104 to reach first pixels 40 disposed at the top, bottom, right, and left ends of first liquid crystal layer 36. This results in allowing user 20 to visually recognize first pixels 40 disposed at the top, bottom, right, and left ends of first liquid crystal layer 36, even when viewing image display device 110 obliquely from the right front direction.

However, such a configuration requires second liquid crystal panel 112 including a particular number of pixels, thereby causing problems such as higher production costs of image display device 110.

By contrast, in this embodiment, image display device 2 includes first liquid crystal panel 16, second liquid crystal panel 18, and backlight 12. First liquid crystal panel 16 displays images on a front surface of first liquid crystal panel 16a. Second liquid crystal panel 18 includes front surface 18a facing rear surface 16b of first liquid crystal panel 16. Backlight 12 irradiates rear surface 18b of second liquid crystal panel 18 with light. First liquid crystal panel 16 includes first front polarizer 22, first rear polarizer 24, and first liquid crystal cell 26. First front polarizer 22 has first transmission axis 28 and is disposed on front surface 16a of first liquid crystal panel 16. First rear polarizer 24 has second transmission axis 30 extending in a direction different from first transmission axis 28, and is disposed on rear surface 16b of first liquid crystal panel 16. First liquid crystal cell 26 is disposed between first front polarizer 22 and first rear polarizer 24. Second liquid crystal panel 18 includes second front polarizer 44, second rear polarizer 46, and second liquid crystal cell 48. Second front polarizer 44 has third transmission axis 50 extending in the same direction as second transmission axis 30, and is disposed on front surface 18a of second liquid crystal panel 18. Second rear polarizer 46 is smaller than first rear polarizer 24 in XY top view, has fourth transmission axis 52 extending in a direction different from third transmission axis 50, and is disposed on rear surface 18b of second liquid crystal panel 18. Second liquid crystal cell 48 is disposed between second front polarizer 44 and second rear polarizer 46.

Since second rear polarizer 46 is smaller than first rear polarizer 24 in XY top view, this configuration provides the following advantageous effects. As indicated by arrow P3 in FIG. 2, the light emitted from backlight 12 obliquely from the right front direction passes through second rear glass substrate 56, second sealing material 62, and second front glass substrate 54, without passing through second rear polarizer 46 of second liquid crystal panel 18. The light having passed through second front glass substrate 54 passes through first rear polarizer 24 of first liquid crystal panel 16, without passing through second front polarizer 44. Thus, the light having passed through first rear polarizer 24 is polarized in a direction parallel to second transmission axis 30 (i.e., along the X-axis) to reach first pixels 40 disposed at the top, bottom, right, and left ends of first liquid crystal layer 36 of first liquid crystal cell 26. This result in allowing user 20 to visually recognize first pixels 40 disposed at the top, bottom, right, and left ends of first liquid crystal layer 36, even when viewing image display device 2 obliquely from the right front direction. That is, the viewing angle increases. Furthermore, second liquid crystal panel 18 requires only the same number of pixels as first liquid crystal panel 16, thereby reducing production costs of image display device 2.

In addition, second liquid crystal cell 48 includes second front glass substrate 54, second rear glass substrate 56, second liquid crystal layer 58, and second sealing material 62. Second front glass substrate 54 faces second front polarizer 44. Second rear glass substrate 56 faces second rear polarizer 46. Second liquid crystal layer 58 is disposed between second front glass substrate 54 and second rear glass substrate 56. Second sealing material 62 is located between second front glass substrate 54 and second rear glass substrate 56, and seals the periphery of second liquid crystal layer 58. Second rear polarizer 46 and second liquid crystal layer 58 have the same size in XY top view.

This configuration allows the size of second rear polarizer 46 to be kept to a minimum. As a result, when user 20 views image display device 2 obliquely from the right front direction, the light coming from backlight 12 more reliably reaches first pixels 40 disposed at the top, bottom, right, and left ends of first liquid crystal layer 36.

Furthermore, second front polarizer 44 is smaller than first rear polarizer 24 in XY top view.

This configuration allows the light coming from backlight 12 to efficiently reach first pixels 40 disposed at the top, bottom, right, and left ends of first liquid crystal layer 36.

Embodiment 2

2.1. Configuration of Image Display Device

Figure 6:
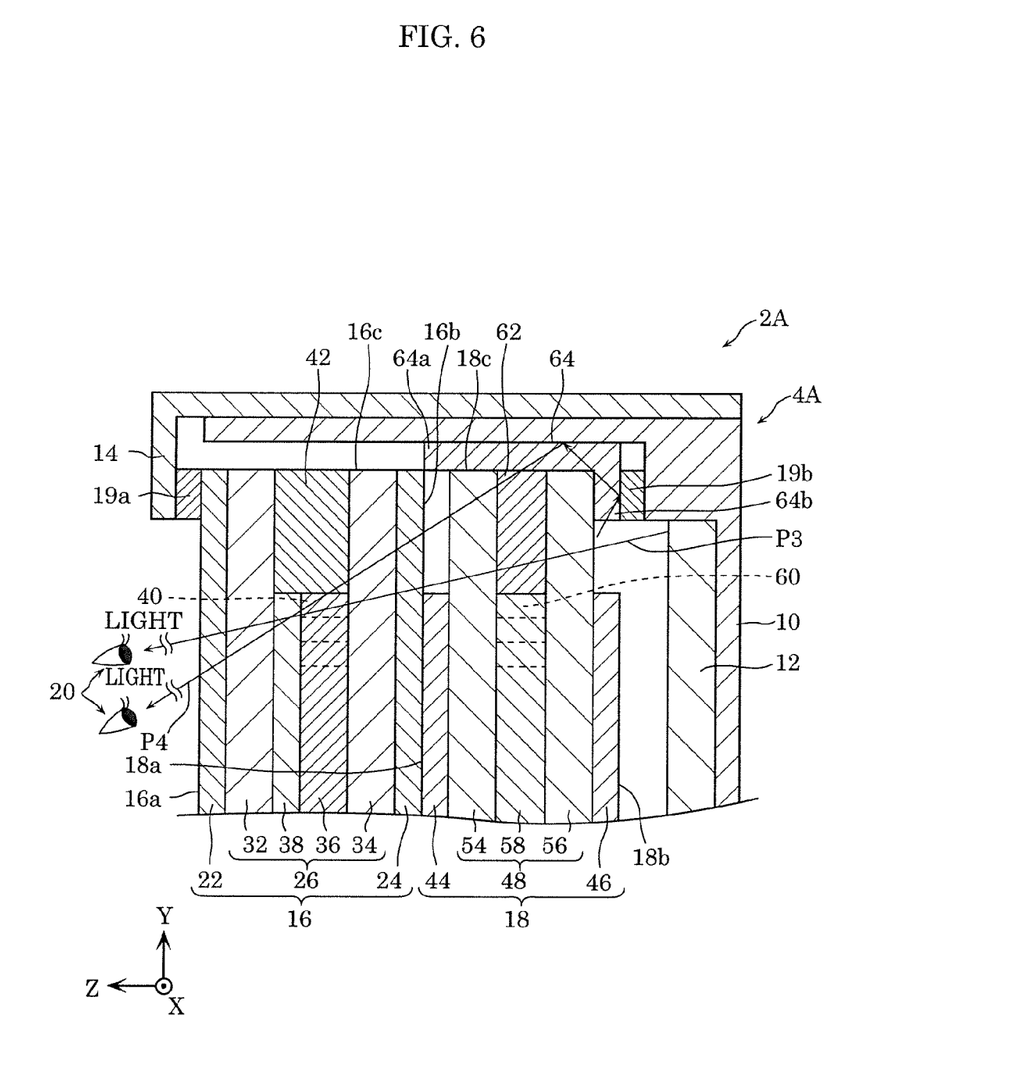
FIG. 6 is a cross-sectional view illustrating a main part of an image display device according to Embodiment 2.

A configuration of image display device 2A according to Embodiment 2 will be described with reference to FIG. 6. FIG. 6 is a cross-sectional view illustrating a main part of image display device 2A according to Embodiment 2. In the following embodiments, the same reference characters as those in Embodiment 1 are used to represent equivalent elements, and the detailed explanation thereof will be omitted.

As shown in FIG. 6, liquid crystal module 4A of image display device 2A according to Embodiment 2 includes light guide plate 64 in addition to the constituent elements described above in Embodiment 1. Light guide plate 64 is an optical member for guiding, to rear surface 16b of first liquid crystal panel 16, the light coming from backlight 12. Light guide plate 64 is formed in a rectangular frame in XY top view, and faces the entire periphery 18c of second liquid crystal panel 18. Light guide plate 64 has an L-shape in YZ cross-sectional side view. First end 64a of light guide plate 64 is disposed in a position corresponding to second front polarizer 44. Second end 64b of light guide plate 64 is sandwiched between second rear glass substrate 56 and cushion member 19b.

If the light coming from light guide plate 64 is incident on periphery 16c of first liquid crystal panel 16, the periphery of the display screen (i.e., first front polarizer 22) of liquid crystal module 4A unintentionally becomes bright. Thus, first end 64a of light guide plate 64 is preferably disposed closer to backlight 12 (i.e., the negative side of the Z-axis) than the position corresponding to second front polarizer 44 so that the light coming from light guide plate 64 is not incident on periphery 16c of first liquid crystal panel 16. If first sealing material 42 is not translucent, first end 64a of light guide plate 64 may be disposed closer to backlight 12 than the position corresponding to first sealing material 42.

2.2. Advantageous Effects

As described above, in this embodiment, image display device 2A further includes light guide plate 64 which faces periphery 18c of second liquid crystal panel 18A to guide, to rear surface 16b of first liquid crystal panel 16, the light coming from backlight 12.

Accordingly, part of the light coming from backlight 12 is incident at second end 64b of light guide plate 64, and guided into light guide plate 64. As indicated by arrow P4 in FIG. 6, the light emitted from light guide plate 64 is incident on periphery 18c of second liquid crystal panel 18, and passes through second sealing material 62 and second front glass substrate 54. The light having passed through second front glass substrate 54 passes through first rear polarizer 24 of first liquid crystal panel 16, without passing through second front polarizer 44. Thus, the light having passed through first rear polarizer 24 is polarized in a direction parallel to second transmission axis 30 (i.e., along the X-axis) to pass through first rear glass substrate 34. After that, the light reaches first pixels 40 disposed at the top, bottom, right, and left ends of first liquid crystal layer 36 of first liquid crystal cell 26. This results in allowing user 20 to visually recognize first pixels 40 disposed at the top, bottom, right, and left ends of first liquid crystal layer 36, even when viewing image display device 2A obliquely from the right front direction at a greater angle. That is, the viewing angle increases.

Embodiment 3

3.1. Configuration of Image Display Device

Figure 7:
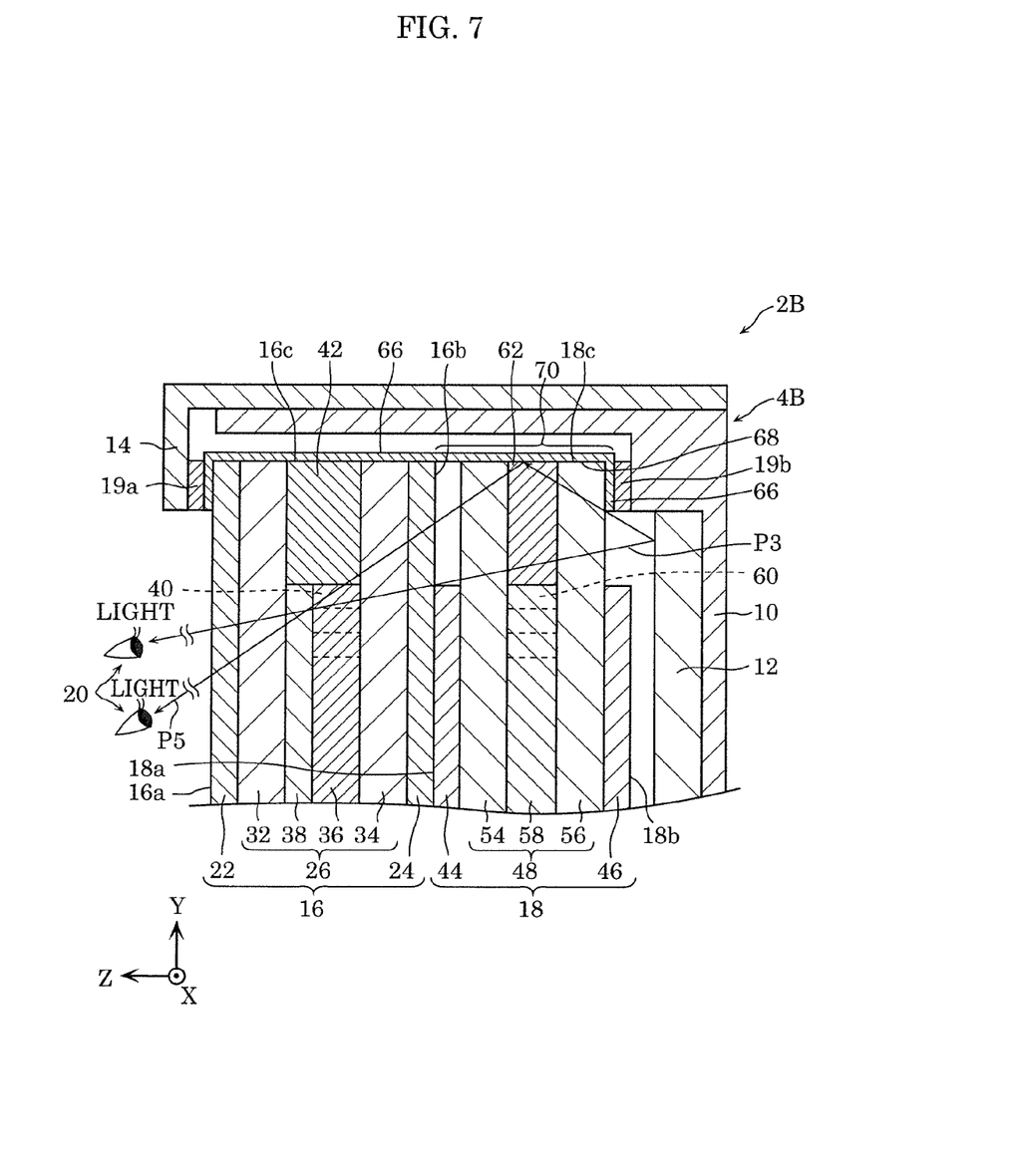
FIG. 7 is a cross-sectional view illustrating a main part of an image display device according to Embodiment 3.

Next, a configuration of image display device 2B according to Embodiment 3 will be described with reference to FIG. 7. FIG. 7 is a cross-sectional view illustrating a main part of image display device 2B according to Embodiment 3.

As shown in FIG. 7, liquid crystal module 4B of image display device 2B according to Embodiment 3 includes fixing tape 66 (an example of a reflecting member) in addition to the constituent elements described above in Embodiment 1. Fixing tape 66 is an adhesive tape for fixing first liquid crystal panel 16 to second liquid crystal panel 18. The adhesive surface of fixing tape 66 is adhered to the four sides of first liquid crystal panel 16 and second liquid crystal panel 18, from periphery 16c of first liquid crystal panel 16 to periphery 18c of second liquid crystal panel 18. Furthermore, the adhesive surface of fixing tape 66 has reflecting surface 68 for reflecting, toward rear surface 16b of first liquid crystal panel 16, the light coming from backlight 12. Reflecting surface 68 is, on the adhesive surface of fixing tape 66, in region 70 facing periphery 18c of second liquid crystal panel 18.

As described above in Embodiment 2, reflecting surface 68 of fixing tape 66 is preferably formed, on the adhesive surface of fixing tape 66, only in region 70 facing periphery 18c of second liquid crystal panel 18 so that the light reflected by reflecting surface 68 is not incident on periphery 16c of first liquid crystal panel 16. If first sealing material 42 is not translucent, reflecting surface 68 may be formed in the entire region of the adhesive surface of fixing tape 66.

3-2. Advantageous Effects

As described above, in this embodiment, image display device 2B further includes fixing tape 66 facing periphery 18c of second liquid crystal panel 18, and having reflecting surface 68 for reflecting, toward rear surface 16b of first liquid crystal panel 16, the light coming from backlight 12.

Accordingly, part of the light coming from backlight 12 passes, for example, through second rear glass substrate 56 and second sealing material 62, without passing through second rear polarizer 46 of second liquid crystal panel 18 to be reflected by reflecting surface 68 of fixing tape 66. The light reflected by reflecting surface 68 of fixing tape 66 is, as indicated by arrow P5 in FIG. 7, incident on periphery 18c of second liquid crystal panel 18, and passes through second sealing material 62 and second front glass substrate 54. The light having passed through second front glass substrate 54 passes through first rear polarizer 24 of first liquid crystal panel 16, without passing through second front polarizer 44. Thus, the light having passed through first rear polarizer 24 is polarized in a direction parallel to the second transmission axis (i.e., along the X-axis) to pass through first rear glass substrate 34. After that, the light reaches first pixels 40 disposed at the top, bottom, right, and left ends of first liquid crystal layer 36 of first liquid crystal cell 26. This result in allowing user 20 to visually recognize first pixels 40 disposed at the top, bottom, right, and left ends of first liquid crystal layer 36, even when viewing image display device 2B obliquely from the right front direction at a greater angle. That is, the viewing angle increases.

In addition, the reflecting member is fixing tape 66 attached from periphery 16c of first liquid crystal panel 16 to periphery 18c of second liquid crystal panel 18, and having reflecting surface 68 at least in region 70 facing periphery 18c of second liquid crystal panel 18.

This configuration allows fixing tape 66 to have the functions of fixing first liquid crystal panel 16 to second liquid crystal panel 18, and reflecting, toward rear surface 16b of first liquid crystal panel 16, the light coming from backlight 12.

Fixing tape 66 may only have the function of reflecting, toward rear surface 16b of first liquid crystal panel 16, the light coming from backlight 12. In this case, fixing tape 66 is attached, for example, to the inner surface (i.e., the surface facing periphery 18c of second liquid crystal panel 18) of lower frame 10.

VARIATIONS

The embodiments have been described above as example techniques disclosed in the present application. However, the techniques of the present disclosure are not limited thereto, and also applicable to embodiments in which modifications, substitutions, additions and omissions are made as appropriate. The constituent elements described above in Embodiments 1 to 3 may be combined to form further embodiments.

Other embodiments will now be described below.

In the embodiments described above, first liquid crystal panel 16 and second liquid crystal panel 18 are twisted nematic liquid crystal panels, but not limited thereto. The panels may be, for example, in-plane switching liquid crystal panels, vertical alignment liquid crystal panels, blue-phase liquid crystal panels, ferroelectric liquid crystal panels, optically compensated bend (OCB) liquid crystal panels, or guest-host liquid crystal panels. Alternatively, two types of these liquid crystal panels may be combined as appropriate to serve as first liquid crystal panel 16 and second liquid crystal panel 18.

While backlight 12 is the direct backlight in the embodiments, the type of backlight is not limited thereto and may be, for example, an edge type.

In Embodiments 2 and 3 described above, light guide plate 64 and fixing tape 66 are disposed, respectively. In place of these light guide plate 64 and fixing tape 66, for example, a plurality of light sources such as LEDs may be disposed. In this case, the light sources face the entire periphery 18c of second liquid crystal panel 18. Since the light coming from the light sources is incident on periphery 18c of second liquid crystal panel 18, this configuration provides the same or similar advantageous effects to those of Embodiments 2 and 3.

In the embodiments described above, second front polarizer 44 is smaller than first rear polarizer 24 in XY top view. The size is not limited thereto. Second front polarizer 44 may have the same size as first rear polarizer 24 in XY top view. This secures a larger area to be adhered with an adhesive, between first rear polarizer 24 and second front polarizer 44.

The embodiments have been described above as example techniques of the present disclosure. The accompanying drawings and detailed description have been provided for this purpose.

Accordingly, the constituent elements included in the accompanying drawings and the detailed description may include not only constituent elements that are essential to solving the problem, but also constituent elements that are not essential to solving the problem, in order to illustrate examples of the techniques. For this reason, these non-essential constituent elements should not be immediately found to be essential constituent elements based on the fact that they are included in the accompanying drawings or detailed description.

The above-described embodiments are for illustrating examples of the techniques of the present disclosure, and therefore various modifications, substitutions, additions, omissions, and the like can be made within the scope of the claims or a scope equivalent thereto.

INDUSTRIAL APPLICABILITY

The present disclosure is applicable to an image display device displaying images. Specifically, the present disclosure is applicable to, for example, a liquid crystal television receiver.

The invention claimed is:

1. An image display device comprising:
a first liquid crystal panel which displays an image on a front surface of the first liquid crystal panel;
a second liquid crystal panel including a front surface facing a rear surface of the first liquid crystal panel; and
a backlight which irradiates a rear surface of the second liquid crystal panel with light, wherein
the first liquid crystal panel includes:
a first front polarizer which has a first transmission axis, and is disposed on the front surface of the first liquid crystal panel;
a first rear polarizer which has a second transmission axis extending in a direction different from the first transmission axis, and is disposed on the rear surface of the first liquid crystal panel; and
a first liquid crystal cell disposed between the first front polarizer and the first rear polarizer, and
the second liquid crystal panel includes:
a second front polarizer which has a third transmission axis extending in a same direction as the second transmission axis, and is disposed on the front surface of the second liquid crystal panel;
a second rear polarizer which is smaller than the first rear polarizer in top view, has a fourth transmission axis extending in a direction different from the third transmission axis, and is disposed on the rear surface of the second liquid crystal panel; and
a second liquid crystal cell disposed between the second front polarizer and the second rear polarizer.

2. The image display device according to claim 1, wherein the second liquid crystal cell includes:
a front transparent substrate which faces the second front polarizer;
a rear transparent substrate which faces the second rear polarizer;
a liquid crystal layer disposed between the front transparent substrate and the rear transparent substrate; and
a sealing material which is located between the front transparent substrate and the rear transparent substrate and seals a periphery of the liquid crystal layer, and
the second rear polarizer and the liquid crystal layer have a same size in top view.

3. The image display device according to claim 1, further comprising:
a light guide plate which faces a periphery of the second liquid crystal panel, and guides, to the rear surface of the first liquid crystal panel, light coming from the backlight.

4. The image display device according to claim 1, further comprising:
a reflecting member which faces a periphery of the second liquid crystal panel, and includes a reflecting surface to reflect, toward the rear surface of the first liquid crystal panel, light coming from the backlight.

5. The image display device according to claim 4, wherein the reflecting member is a fixing tape which is attached from a periphery of the first liquid crystal panel to the periphery of the second liquid crystal panel and includes the reflecting surface at least in a region facing the periphery of the second liquid crystal panel.

6. The image display device according to claim 1, wherein the second front polarizer is smaller than the first rear polarizer in the top view.

* * * * *